United States Patent
Ooghe et al.

(10) Patent No.: US 8,054,835 B2
(45) Date of Patent: Nov. 8, 2011

(54) METHOD AND APPARATUS OF DIRECTING MULTICAST TRAFFIC IN AN ETHERNET MAN

(75) Inventors: Sven Ooghe, Ghent (BE); Christian Marie Adelin Hublet, Lochristi (BE); Dirk Eugène Ida Ooms, Antwerp (BE)

(73) Assignee: Alcatel Lucent, Paris (FR)

( * ) Notice: Subject to any disclaimer, the term of this patent is extended or adjusted under 35 U.S.C. 154(b) by 1883 days.

(21) Appl. No.: 10/314,183

(22) Filed: Dec. 9, 2002

(65) Prior Publication Data

US 2003/0123453 A1    Jul. 3, 2003

(30) Foreign Application Priority Data

Dec. 10, 2001   (EP) .................................. 01403212

(51) Int. Cl.
*H04L 12/28* (2006.01)
*H04L 12/56* (2006.01)
(52) U.S. Cl. .................................. 370/393; 370/395.53
(58) Field of Classification Search .................. 370/390, 370/395.53, 350, 389, 391, 392, 393, 397
See application file for complete search history.

(56) References Cited

U.S. PATENT DOCUMENTS

| | | | |
|---|---|---|---|
| 5,920,566 A | | 7/1999 | Hendel et al. |
| 5,959,989 A | * | 9/1999 | Gleeson et al. ............... 370/390 |
| 6,151,322 A | * | 11/2000 | Viswanath et al. ....... 370/395.53 |
| 6,181,699 B1 | * | 1/2001 | Crinion et al. ................. 370/392 |
| 6,188,691 B1 | * | 2/2001 | Barkai et al. .................. 370/390 |
| 6,370,142 B1 | * | 4/2002 | Pitcher et al. ................. 370/390 |
| 6,618,388 B2 | * | 9/2003 | Yip et al. ...................... 370/401 |
| 6,754,211 B1 | * | 6/2004 | Brown .......................... 370/389 |
| 6,975,581 B1 | * | 12/2005 | Medina et al. ................ 370/401 |
| 6,977,891 B1 | * | 12/2005 | Ranjan et al. ................. 370/229 |
| 7,133,371 B2 | * | 11/2006 | Helm et al. ................... 370/270 |
| 7,136,374 B1 | * | 11/2006 | Kompella ..................... 370/352 |
| 7,389,359 B2 | * | 6/2008 | Jain et al. ...................... 709/238 |
| 7,450,584 B2 | * | 11/2008 | Okano et al. ................. 370/392 |
| 7,519,056 B2 | * | 4/2009 | Ishwar et al. ............ 370/395.53 |
| 2002/0012345 A1 | * | 1/2002 | Kalkunte et al. ............. 370/389 |
| 2002/0150094 A1 | * | 10/2002 | Cheng et al. ................. 370/389 |
| 2003/0012202 A1 | * | 1/2003 | Fukutomi ................ 370/395.52 |
| 2003/0095554 A1 | * | 5/2003 | Shimizu .................. 370/395.53 |
| 2003/0165140 A1 | * | 9/2003 | Tang et al. .................... 370/393 |
| 2005/0083949 A1 | * | 4/2005 | Dobbins et al. ......... 370/395.53 |
| 2005/0180345 A1 | * | 8/2005 | Meier ........................... 370/310 |
| 2006/0146823 A1 | * | 7/2006 | Ding ............................. 370/390 |

FOREIGN PATENT DOCUMENTS

EP    1045553 A2    10/2000
WO   WO 0056018    9/2000

* cited by examiner

Primary Examiner — Warner Wong
(74) Attorney, Agent, or Firm — Sughrue Mion, PLLC

(57) ABSTRACT

Method and apparatuses for directing multicast traffic in an Ethernet network include sending a multicast message upstream to a metro access node, performing IGMP snooping at the metro access node and assigning a multicast VLAN tag to the multicast message, performing IGMP snooping at an Ethernet switch disposed upstream to determine each port used for a corresponding multicast group address and multicast VLAN tag associated with the multicast group address, receiving the multicast message at an access server or edge router and sending the multicast message including the multicast group address and the multicast VLAN tag, downstream to a port based on that information, thereby avoiding duplication of the multicast message to another port other than the port associated with the multicast VLAN tag.

22 Claims, 2 Drawing Sheets

METHOD AND APPARATUS OF DIRECTING MULTICAST TRAFFIC IN AN ETHERNET MAN

The present invention relates to directing multicast traffic of different service providers and improving bandwidth efficiency when offering multicast services in addition to residential Internet access in an Ethernet Metropolitan Area Network (E-MAN), by preventing duplication of multicast traffic when using a multicast router in conjunction with Internet Group Management Protocol (IGMP) snooping.

Local area networks (LANs) of all types are IEEE 802 compliant and may be connected together with media access control (MAC) bridges. Various LANs may be grouped together to form Virtual LANs (VLANs). VLAN groups are made of logical workgroups of users who may be physically separated from one another. The IEEE 802.1Q standard defines the operation of VLAN bridges that permit the definition, operation, and administration of VLAN topologies within a bridged LAN infrastructure. VLANs provide privacy and security to members of the workgroups, and provide broadcast domains whereby broadcast traffic is kept inside the VLAN.

With an E-MAN, the customer experiences high-speed connectivity towards the Internet or a corporate environment. Additionally, a MAN provider has opportunities to easily offer new services to its customers such as Transparent LAN Services (also known as TLS). When using an E-MAN to provide services such as Internet access to residential customers, the use of Ethernet VLAN tags is required to provide customer segregation. In the E-MAN, each customer has a unique VLAN tag. An Ethernet packet is only distributed towards customers assigned to this VLAN tag, i.e., the VLAN tag controls the amount of flooding in the Ethernet network.

VLAN tags are used to provide the customer security and segregation. Each VLAN may be identified by a color code (i.e., red, yellow, etc.). Switches associate each internal port with at least one VLAN color tag. Since all entities located on a given LAN utilize the same shared port of the corresponding switch, each of these entities is also associated with the VLAN designation assigned to that port. Each external port of switches is similarly associated with one or more VLAN designations. To identify the various VLAN designations defined through the network, switches and routers typically participate in a VLAN configuration protocol.

Content addressable memory in switches and routers store the tagging part of which is to be inserted into frames to enable VLAN functionality, and may also store priority information. The tagging information and priority information are collectively referred to as tag data. The tagging information also includes lookup data which is associated with the tag data. Preferably each set of lookup data is unique and corresponds to one set of tag data.

Multicast refers to the transmission of information to a group of recipients (a multicast group) via a single transmission by the source. The server sends an individual copy of each data packet to all users in the interest group (i.e., VLAN) or other multicast group. Network-based multicast services allow servers and other data sources to send out a single packet that is automatically copied and distributed by network devices, such as routers or switches.

In a classical Ethernet LAN, bandwidth efficiency for multicast traffic is achieved by using the so-called Internet Group Management/Membership Protocol (IGMP) snooping. Prior art systems snoop the data from the individual user to identify which users are joining a particular multicast group, the quality of service needed by the users and other parameters, to establish multicast filtering.

IGMP snooping is performed irrespective of the use of VLAN tags. Group management for Internet Protocol (IP) multicast traffic is accomplished by using IGMP and Protocol Independent Multicast (PIM). The customer subscribes to the group by sending an IGMP report message using as the destination IP address the multicast address for that group. This message is received by the first hop upstream router or server, and triggers PIM to notify the upstream multicast router or server, whereby a multicast tree is built.

For an E-MAN, as shown in FIG. 1, during upstream registration, the customers 1, 2 send IGMP reports 3, 4 or join messages 3, 4, respectively, to the Broadband Remote Access Server (BRAS) 9 or the Edge Router 9, crossing a metro access node 5, and a number of Ethernet switches 8 before it arrives at its destination. To preserve the bandwidth in the E-MAN, the switches 8 are snooping IGMP packets 6, 7 and use the information in these packets 6, 7 to determine which segments should receive packets directed to the group address. This prevents sending a multicast packet downstream on ports 1, 2 that have no interest in that multicast stream.

The use of VLAN tags, however, impacts the operation of multicast in the E-MAN. Since every customer 1, 2 has a unique VLAN tag, the multicast traffic 6, 7 is duplicated at the ingress point of the E-MAN, i.e., the BRAS 9 or edge router 9. Thus, if the multicast router 9 or server 9 connected to the E-MAN receives IGMP join messages 3, 4 with different VLAN tags, it sends multicast traffic for all these VLANs. This implies a duplication of traffic, i.e., multiple Ethernet frames 10, 11 with different VLAN tags are sent downstream from the BRAS 9 or server 9 via switches 12 to the metro access node 5 and to customers 1, 2, which is bandwidth inefficient.

Therefore, offering multicast services in addition to residential Internet access gives rise to a bandwidth efficiency problem.

SUMMARY OF THE INVENTION

Methods and apparatuses consistent with that of the present invention relate to introducing a separate VLAN tag for multicast traffic, called a multicast-VLAN tag, at a metro access node, which must be used by each BRAS or edge router for its downstream multicast traffic, and which provides bandwidth efficiency by segregating multicast traffic of different service providers and preventing duplication of multicast traffic when used in conjunction with IGMP snooping.

In one embodiment consistent with the present invention, a method of directing multicast traffic in an Ethernet network, includes assigning a multicast VLAN tag at a metro access node of the Ethernet network, to a multicast message sent upstream from a port to an access server or edge router, such that the multicast VLAN tag is associated with a corresponding access server or edge router; determining a port to which to send a multicast message downstream from the access server or edge router, based on a multicast group address and the multicast VLAN tag for the multicast group address.

In another embodiment consistent with the present invention, the assigning step is performed using IGMP snooping.

In yet another embodiment consistent with the present invention, the IGMP snooping is also performed at intermediate switches disposed upstream from the metro access node, to determine which port to use for the multicast message, based on the multicast group address and the multicast VLAN tag.

In yet another embodiment consistent with the present invention, the access server or edge router is able to retrieve only each multicast message assigned with the multicast VLAN tag corresponding directly to that access server or edge router.

In yet another embodiment consistent with the present invention, the determining step is performed at intermediate switches disposed downstream from the access server or edge router.

In yet another embodiment consistent with the present invention, the multicast message is sent downstream from the access server or edge router to the determined port without duplication of the multicast message.

In yet another embodiment consistent with the present invention, the intermediate switches disposed downstream from the access server or edge router include subscription tables containing a list of multicast group addresses and multicast VLAN tags.

In yet another embodiment consistent with the present invention, each multicast message is segregated from other multicast messages destined for different access servers or edge routers disposed upstream and different ports disposed downstream in the network.

In yet another embodiment consistent with the present invention, the method of multicasting data packets in an Ethernet network, includes transmitting a multicast message upstream to an access server or edge router via a metro access node, to join a multicast session; storing information including the multicast message, upon reception of the multicast message by the metro access node, the information including a relation between the multicast message and a multicast reference that identifies the multicast session and a port identification via which the multicast message is received; defining a multicast VLAN tag as the multicast reference, the multicast VLAN tag which is associated with a plurality of users which are using the metro access node, and associating the multicast VLAN tag with the multicast message; downstream multicasting the data packets of the multicast session, wherein the access server or edge router receives the data packets according to the stored information and inserts the associated multicast VLAN tag into a copy of the downstream data packets and downstream transmits a copy of the multicast message to each port based on each group destination address and associated multicast VLAN tag.

In yet another embodiment consistent with the present invention, a metro access node includes means for assigning multicast VLAN tags into multicast messages sent upstream to an access server or edge router; and means for storing multicast group addresses, port identifications, and the multicast VLAN tags.

In yet another embodiment consistent with the present invention, an intermediate Ethernet network switch disposed between a user and an access server or edge router includes means for determining a destination of a multicast message based on a combination of a multicast group address and a multicast VLAN tag associated with the multicast message; and means for forwarding the multicast message to the destination based on the combination of the multicast group address and the multicast VLAN tag.

In yet another embodiment consistent with the present invention, the determining means of the intermediate Ethernet network switch includes means for storing subscription tables which contain a list of multicast group addresses and multicast VLAN tags.

In yet another embodiment consistent with the present invention, an apparatus which directs multicast traffic in an Ethernet network, includes a metro access node which receives a multicast message from a port, performs IGMP snooping, and assigns a multicast VLAN tag to the multicast message; a first intermediate Ethernet switch disposed upstream from the metro access node, which determines each port used for a corresponding multicast group address and multicast VLAN tag for the multicast group address; an access server or edge router which receives the multicast message and sends the multicast message downstream after adding the multicast VLAN tag to the multicast group address; and a second intermediate Ethernet switch disposed downstream from the access server or edge router, which forwards the multicast message to a port based on the multicast group address and the multicast VLAN tag.

In yet another embodiment consistent with the present invention, an apparatus which directs multicast traffic in an Ethernet network, includes means for assigning a multicast VLAN tag at a metro access node of the Ethernet network, to a multicast message sent upstream from a port to an access server or edge router, such that the multicast VLAN tag is associated with the corresponding access server or edge router; and means for determining a port to which to send a multicast message downstream from the access server or edge router, based on a multicast group address and the multicast VLAN tag for the multicast group address.

There has thus been outlined, rather broadly, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DETAILED DESCRIPTION OF THE PREFERRED EMBODIMENTS

Methods and apparatuses consistent with the present invention include introducing a separate multicast-VLAN tag for multicast traffic at a metro access node, which is used by each BRAS or edge router for its downstream multicast traffic, and which prevents duplication of multicast traffic when used in conjunction with IGMP snooping.

For normal unicast traffic, the normal VLAN tags are still in use whereby customer segregation and security is ensured. Therefore, the VLAN tags are added at the Metro Access Node according to the conventional method, and sent to the Service Provider access server or BRAS.

Figure 1:
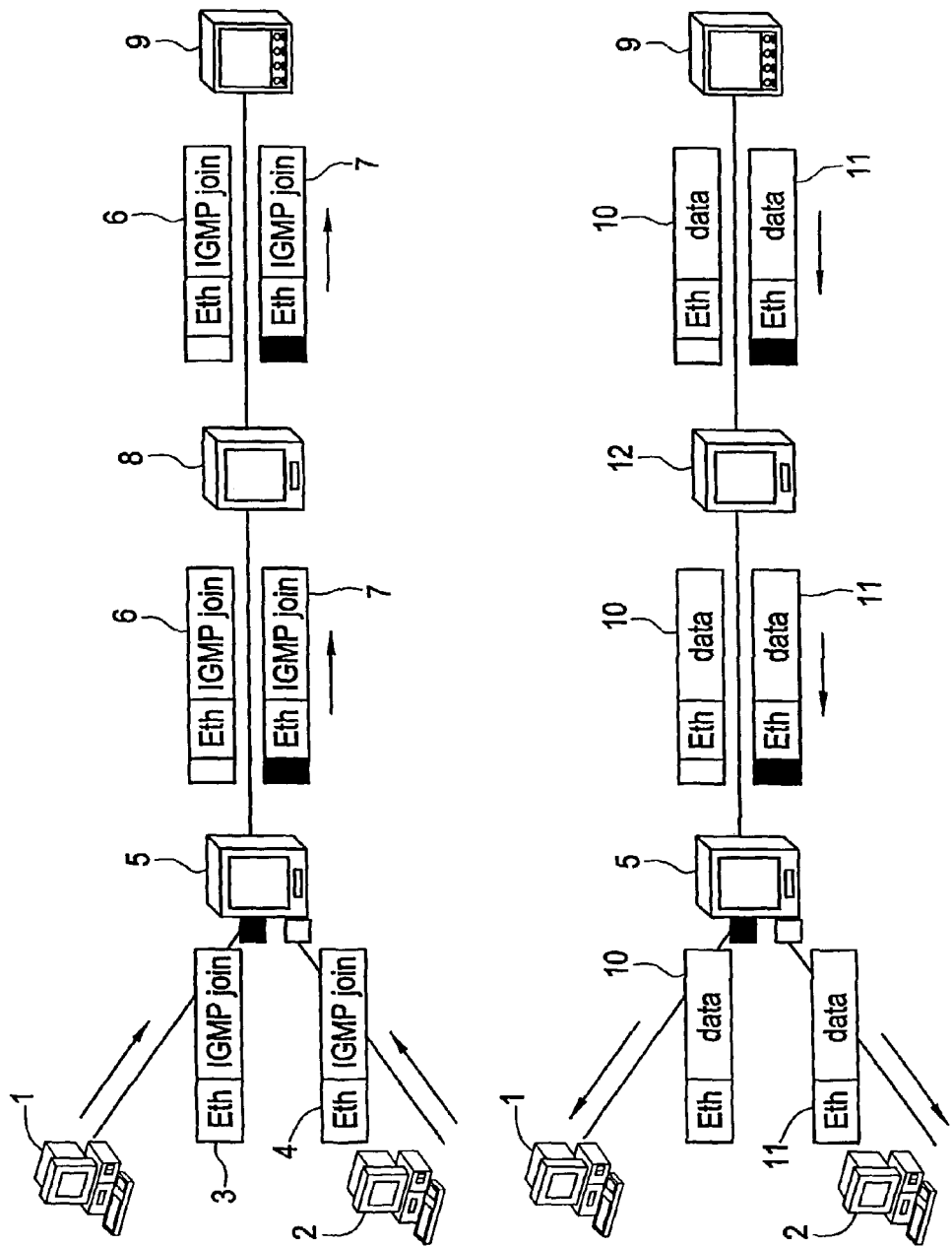
FIG. 1 depicts conventional IGMP snooping and multicasting with downstream duplication of packets.
Figure 2:
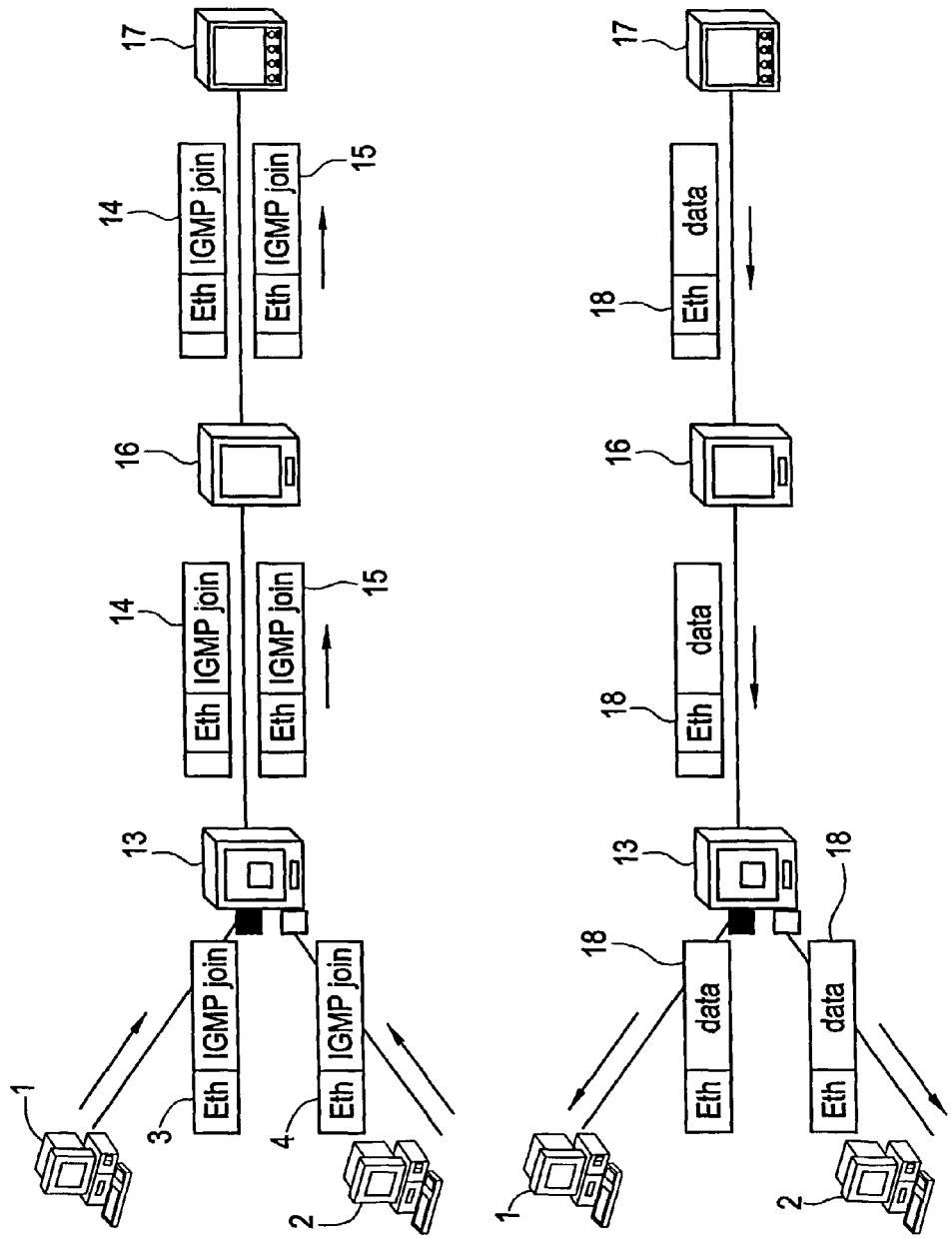
FIG. 2 depicts one embodiment consistent with the present invention, wherein multicast traffic is sent to customers using a multicast VLAN tag.

However, as shown in FIG. 2, for multicast traffic, a single multicast-VLAN tag as a multicast reference, is introduced for all users or customers 1, 2 using the same access server 17 or edge router 17 connected to the MAN. The MAN management provides to the different Metro Access Nodes 13 the to-be-used multicast-VLAN tag, and the E-MAN provider assigns a VLAN tag per connected service provider, and installs rules in the Metro Access Nodes 13, in memory, as means for determining the service provider of the connected customer 1, 2, and associating that service provider to the multicast VLAN tag that has to be used for that traffic. The Metro Access Node 13 can be pre-configured to associate the VLAN tag with a customer, or can be programmed to determine which VLAN tag to associate with a customer based on the information in the multicast message 3, 4.

During registration, the customers 1, 2 send IGNP report messages (join messages) 3, 4 upstream, which are untagged or tagged with a unicast VLAN-tag that is used by those customers 1, 2. The Metro Access Nodes 13 include a storage medium or memory as means for storing information received from the customers 1, 2, including the join messages 3, 4 and a relation between the IGMP report message, multicast group message, and a multicast VLAN tag that identifies the multicast session and the port identification 1, 2, via which the join messages 3, 4 are received.

In the Metro Access Nodes 13, IGMP snooping takes place, after which each IGMP message is (re)tagged with the multicast VLAN tag by the Metro Access Nodes 13 as assigning means. As the messages 14, 15 are forwarded upstream, each Ethernet switch 16, as forwarding means, performs IGMP snooping and multicast VLAN tag learning, in order to remember and determines, as determining means, which port (s) to use for a corresponding certain multicast group address. Additionally, the switch 16, also as determining means, remembers and determines which VLAN tag is used for the specified multicast group address. In this way, the IGMP messages 14, 15 reach their destination via the service provider access server 17 or edge router 17. Note that because different VLAN tags are used for multicast streams of different access servers 17 or edge routers 17, that it is ensured that IGMP report messages 14, 15 destined for one service provider are not seen by another service provider.

For the downstream multicast traffic, the access server 17 or edge router 17 connected to the E-MAN inserts the same multicast group address as well as the multicast VLAN tag into a copy of the downstream data packets 18, using the information which was stored by the upstream Metro Access Node 13 with the messages 14, 15, in order to forward the downstream multicast packets 18 with the appropriate multicast VLAN tags. This ensures that downstream multicast traffic of one access server 17 or edge router 17 does not arrive at customers connecting to another access server or edge router. No duplication of data packets 18 with different VLAN tags takes place. If necessary, the original unicast VLAN tag is put back in the multicast packets 18 before delivery to the customers 1, 2.

In the downstream multicast traffic, the switch 16 utilizes a subscription table which may include content addressable memories as storing means, and which contains a current list of all group destination addresses and the multicast VLAN tags of the subscribing entities thereto, as well as the specific ports to which the multicast traffic should be sent. Although only a single switch 16 is shown in FIG. 2 both upstream and downstream, a plurality of switches 16 as intermediate Ethernet switches, can be utilized.

When the multicast traffic arrives at Metro Access Node 13 downstream from the switches 16, the Metro Access Node 13 transmits one copy of the data packets 18 to each port 1, 2 and for each multicast VLAN tag.

The advantage of ensuring no duplication of data packets to customers with different VLAN tags is that customer segregation is retained. Therefore, multicast traffic of different service providers is segregated—even if more than one BRAS 17 or edge router 17 is connected to the E-MAN, their multicast traffic is segregated. This not only holds true for the downstream multicast traffic stream 18, but also for the upstream IGMP report messages 14, 15.

Of course, although multiple customers of one service provider are put in a single group for multicast traffic, the unicast traffic is still segregated per customer. It is not possible for one customer to send unicast traffic to another customer, unless they have the same VLAN tag, i.e., in the event of Virtual Private Network (VPN) service.

Further, the addition of a multicast VLAN tag at the Metro Access Node 13 is transparent to the customer 1, 2. The customer 1, 2 is not aware of the presence of the multicast VLAN tags being added at the Metro Access Node 13. The customer 1, 2 just sends untagged reports 3, 4 toward the network.

Thus, the above-described methods and apparatuses provide multicast services in a bandwidth efficient way, and at the same time, preserve customer segregation.

While methods and apparatuses consistent with the present invention has been particularly shown with reference to the above embodiments, it will be understood by those skilled in the art that various other changes in the form and details may be made therein without departing from the spirit and the scope of the invention.

The invention claimed is:

1. A method of directing multicast traffic in an Ethernet network, comprising:
   assigning a multicast Virtual Local Area Network (VLAN) tag at a metro access node of the Ethernet network, to a multicast message sent upstream from a port to one of an access server and an edge router, wherein said multicast VLAN tag identifies said corresponding one of said access server and said edge router;
   determining a port to which a multicast message is to be sent downstream from said one of said access server and said edge router, based on a multicast group address and said multicast VLAN tag for said multicast group address.

2. The method according to claim 1, wherein said assigning step is performed using Internet Group Management/Membership Protocol (IGMP) snooping.

3. The method according to claim 2, wherein said IGMP snooping is performed at intermediate switches disposed upstream from said metro access node, to determine a port to be used for said multicast message based on said multicast group address and said multicast VLAN tag.

4. The method according to claim 3, wherein said one of said access server and said edge router is able to retrieve only each multicast message assigned with said multicast VLAN tag corresponding directly to said one of said access server and said edge router.

5. The method according to claim 1, wherein said determining step is performed at intermediate switches disposed downstream from said one of said access server and said edge router.

6. The method according to claim 5, where said multicast message is sent downstream from said one of said access server and said edge router to said determined port without duplication of said multicast message.

7. The method according to claim 5, wherein said intermediate switches disposed downstream from said one of said access server and said edge router comprise subscription tables containing a list of multicast group addresses and multicast VLAN tags.

8. The method according to claim 4, wherein each said multicast message is segregated from other multicast messages destined for different one of access servers and edge routers disposed upstream and different ports disposed downstream in the network.

9. A method of directing multicast traffic in an Ethernet network, comprising:
- receiving a multicast message delivered upstream to a metro access node;
- performing IGMP snooping at said metro access node;
- assigning a multicast Virtual Local Area Network (VLAN) tag to said multicast message at said metro access node;
- performing Internet Group Management/Membership Protocol (IGMP) snooping at each of at least one Ethernet switch disposed upstream from said metro access node in order to determine each port used for a corresponding multicast group address and multicast VLAN tag associated with said multicast group address;
- receiving said multicast message at one of an access server and an edge router disposed upstream from said at least one Ethernet switch;
- sending said multicast message downstream from said one of said access server and said edge router, said one of said access server and said edge router including said multicast group address and said multicast VLAN tag in said multicast message; and
- providing said multicast message to a port downstream from said one of said access server and said edge router, based on said multicast group address and said multicast VLAN tag;
- wherein duplication of said multicast message to another port other than said port downstream of said one of said access server and said edge router is avoided based on information determined at said metro access node regarding said multicast group address and said multicast VLAN tag.

10. The method according to claim 9, wherein said multicast VLAN tag designates one of a predetermined access server and edge router.

11. The method according to claim 10, wherein said metro access node is one of pre-configured to associate said multicast VLAN tag with a user, and determines which multicast VLAN tag to associate with a user based on information in said multicast message.

12. The method according to claim 9, wherein said metro access node includes a storage medium to store information on a multicast session to which said multicast message refers, and a port identification from which said multicast message is received.

13. The method according to claim 9, wherein said providing step is performed by at least one Ethernet switch disposed downstream from said one of said access server and said edge router, and said switch determines said port to which to send said multicast message based on said multicast group address and said multicast VLAN tag.

14. The method according to claim 10, wherein said one of said access server and said edge router is able to retrieve only each multicast message assigned with said multicast VLAN tag corresponding directly to said one of said access server and said edge router.

15. A method of segregating multicast traffic of a plurality of service providers in an Ethernet network, comprising:
- sending a multicast message from a port upstream to a metro access node;
- performing IGMP snooping at said metro access node;
- assigning a multicast Virtual Local Area Network (VLAN) tag to said multicast message at said metro access node and said multicast VLAN tag being associated with a corresponding one of an access server and an edge router;
- performing Internet Group Management/Membership Protocol (IG.MP) snooping at each of at least one Ethernet switch disposed upstream from said metro access node in order to determine each port used for a corresponding multicast group address and multicast VLAN tag associated with said multicast group address;
- receiving said multicast message at said one of said access server and said edge router upstream from said at least one Ethernet switch, wherein said multicast message destined for one access server and edge router is segregated from another multicast message destined for another access server and edge router based on said multicast group address and said multicast VLAN tag; and
- sending said multicast message downstream from said access server to said port from which said upstream multicast message was received, said one of said access server and said edge router including said multicast group address and said multicast VLAN tag in said multicast message;
- wherein duplication of said multicast message to another port other than said port downstream of said one of said access server and said edge router is avoided based on information determined at said metro access node regarding said multicast group address and said multicast VLAN tag.

16. A method of multicasting data packets in an Ethernet network, comprising:
- transmitting a multicast message upstream to one of an access server and an edge router via a metro access node, to join a multicast session;
- storing information including said multicast message, upon reception of said multicast message by said metro access node, the information including a relation between said multicast message and a multicast reference that identifies said multicast session and a port identification via which said multicast message is received;
- defining a multicast Virtual Local Area Network (VLAN) tag as said multicast reference, said multicast VLAN tag which is associated with a plurality of users which are using said metro access node, and associating said multicast VLAN tag with said multicast message;
- downstream multicasting the data packets of said multicast session, wherein said one of said access server and said edge router receives the data packets according to said stored information and inserts said associated multicast VLAN tag into a copy of the downstream data packets and downstream transmits a copy of said multicast message to each port based on each group destination address and associated multicast VLAN tag.

17. A metro access node comprising:

means for assigning multicast Virtual Local Area Network (VLAN),tags into multicast messages sent upstream to one of an access server and an edge router;

means for storing multicast group addresses, port identifications, and said multicast VLAN tags;

means for determining a destination of a multicast message based on a combination of a multicast group address and a multicast Virtual Local Area Network (VLAN) tag associated with said multicast message, wherein said VLAN tag identifies said one of an access server and an edge router.

18. An intermediate Ethernet network switch disposed between a user and one of an access server and an edge router, said switch comprising:

means for determining a destination of a multicast message based on a combination of a multicast group address and a multicast Virtual Local Area Network (VLAN) tag associated with said multicast message, wherein said VLAN tag identifies said one of an access server and an edge router; and means for forwarding said multicast message to said destination based on said combination of said multicast group address and said multicast VLAN tag.

19. The intermediate Ethernet network switch according to claim 18, wherein said determining means includes means for storing a subscription table which contains a list of multicast group addresses and multicast VLAN tags.

20. An apparatus which directs multicast traffic in an Ethernet network, comprising:

a metro access node which receives a multicast message from a port, performs Internet Group Management/ Membership Protocol (IGMP) snooping, and assigns a multicast Virtual Local Area Network (VLAN) tag to said multicast message, wherein said VLAN tag identifies said one of an access server and an edge router;

a first intermediate Ethernet switch disposed upstream from said metro access node, which determines each port used for a corresponding multicast group address and multicast VLAN tag for said multicast group address;

one of an access server and an edge router which receives said multicast message and sends said multicast message downstream after adding said multicast VLAN tag to said multicast group address; and a second intermediate Ethernet switch disposed downstream from said one of said access server and said edge router, which forwards said multicast message to a port based on said multicast group address and said multicast VLAN tag.

21. An apparatus which directs multicast traffic in an Ethernet network, comprising means for assigning a multicast Virtual Local Area Network (VLAN) tag at a metro access node of the Ethernet network, to a multicast message sent upstream from a port to one of an access server and an edge router, such that said multicast VLAN tag identifies said corresponding one of said access server and said edge router; and means for determining a port to which to send a multicast message downstream from said one of said access server and said edge router, based on a multicast group address and said multicast VLAN tag for said multicast group address.

22. An edge router in an Ethernet network, said edge router comprising:

means for receiving a multicast message sent upstream from a port, said multicast message having a multicast Virtual Local Area Network (VLAN) tag assigned at a metro access node of the Ethernet network, wherein said multicast VLAN tag identifies the edge router;

means for determining a port to which a multicast message is to be sent downstream from the edge router, based on a multicast group address and said multicast VLAN tag for said multicast group address.

\* \* \* \* \*